(12) United States Patent
Moritomo

(10) Patent No.: US 11,977,618 B2
(45) Date of Patent: May 7, 2024

(54) ELECTRONIC DEVICE AND CONTROL METHOD

(71) Applicant: CANON KABUSHIKI KAISHA, Tokyo (JP)

(72) Inventor: Hiroshi Moritomo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 309 days.

(21) Appl. No.: 17/530,797

(22) Filed: Nov. 19, 2021

(65) Prior Publication Data

US 2022/0164432 A1  May 26, 2022

(30) Foreign Application Priority Data

Nov. 25, 2020 (JP) ................. 2020-195360

(51) Int. Cl.
| | | |
|---|---|---|
| *G06F 7/04* | (2006.01) | |
| *G06F 1/26* | (2006.01) | |
| *G06F 13/38* | (2006.01) | |
| *G06F 21/44* | (2013.01) | |
| *H02J 7/00* | (2006.01) | |

(52) U.S. Cl.
CPC .............. *G06F 21/44* (2013.01); *G06F 1/266* (2013.01); *G06F 13/382* (2013.01); *H02J 7/00045* (2020.01); *G06F 2213/0042* (2013.01)

(58) Field of Classification Search
CPC .......... G06F 21/44; G06F 21/81; G06F 1/266; G06F 1/263; G06F 13/382; G06F 2213/0042; G06F 2221/2129; H02J 7/00045; H02J 2207/30; H04L 12/10; H04L 63/08; H04L 63/0823
See application file for complete search history.

(56) References Cited

U.S. PATENT DOCUMENTS

| | | | |
|---|---|---|---|
| 2011/0023111 A1* | 1/2011 | Gunadisastra | G06F 21/44 726/16 |
| 2013/0133088 A1* | 5/2013 | Gunadisastra | G06F 21/44 726/34 |
| 2018/0166886 A1* | 6/2018 | Ueta | G06F 1/266 |
| 2019/0212795 A1* | 7/2019 | Moritomo | G06F 1/26 |

FOREIGN PATENT DOCUMENTS

| | | |
|---|---|---|
| JP | 2018-097643 A | 6/2018 |
| WO | WO-2019015681 A1 * | 1/2019 ........... G06F 13/385 |

\* cited by examiner

*Primary Examiner* — Richard G Keehn
(74) *Attorney, Agent, or Firm* — Cowan, Liebowitz & Latman, P.C.

(57) ABSTRACT

An electronic device having a cable includes a storage unit and a communication unit. The storage unit stores first authentication information used for an authentication communication directed to the electronic device and second authentication information used for an authentication communication directed to the cable. The communication unit is capable of responding to an authentication communication directed to the electronic device and is also capable of responding to an authentication communication directed to the cable.

14 Claims, 4 Drawing Sheets

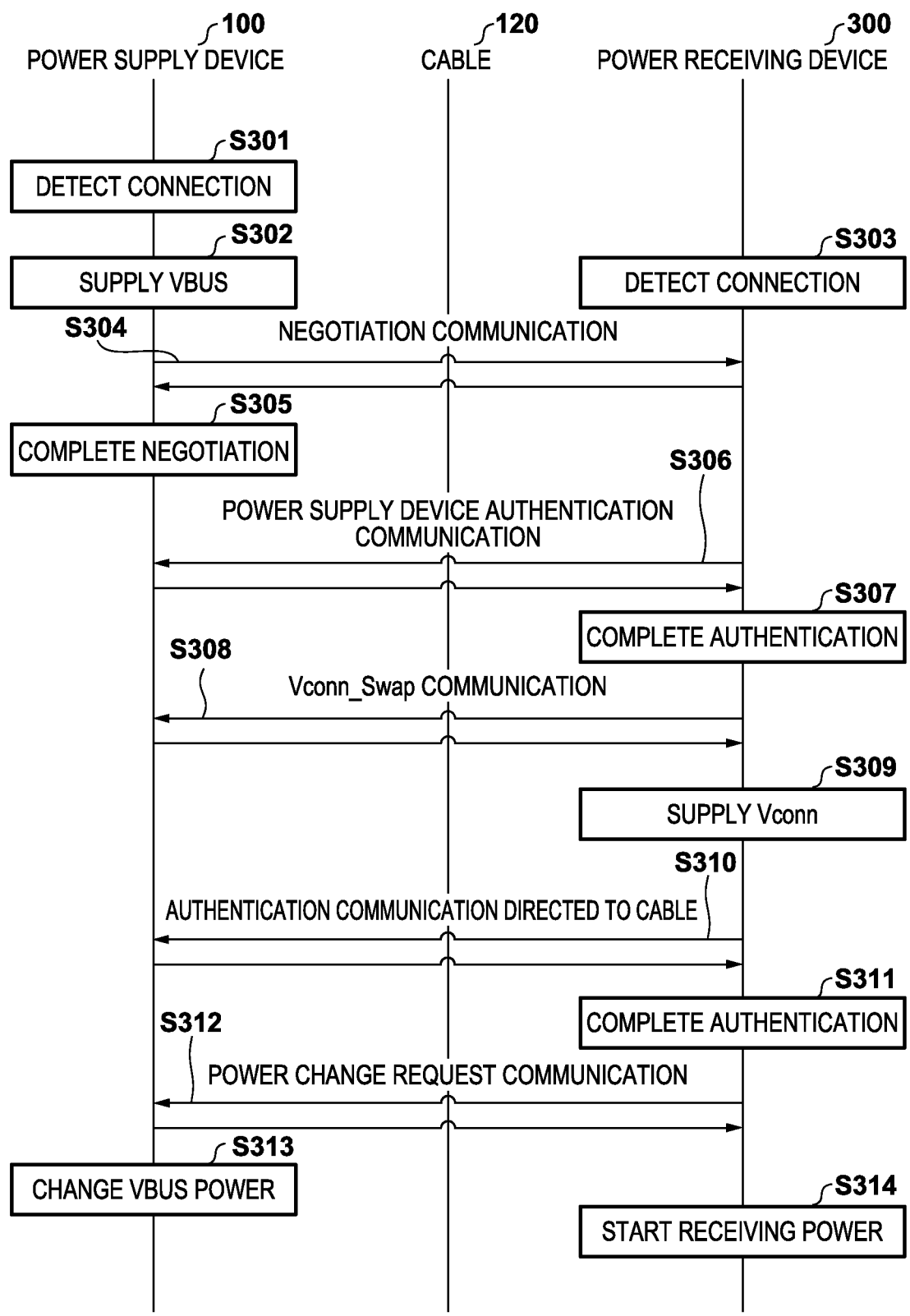

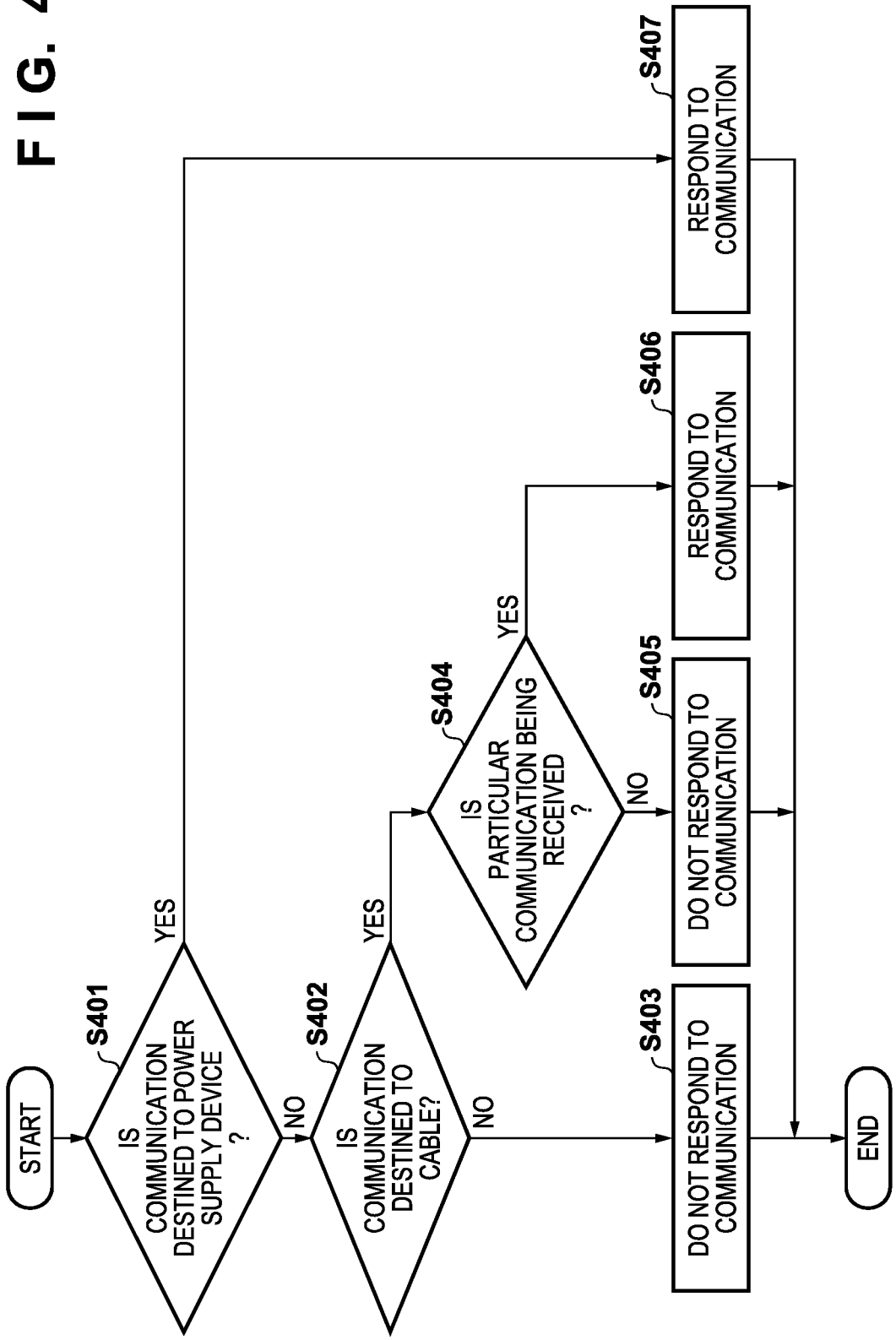

ELECTRONIC DEVICE AND CONTROL METHOD

BACKGROUND

Field of the Disclosure

Aspects of the disclosure generally relate to an electronic device, and a method of controlling the electronic device.

Description of the Related Art

USB (Universal Serial Bus) Type-C and USB PD (Power Delivery) standards are known as standards related to USBs. USB interfaces conforming to the USB PD standard can supply up to 100 W of power.

Japanese Patent Laid-Open No. 2018-097643 describes a power supply device that performs authentication communication with each of a power receiving device and a USB cable.

Hereinafter, a power supply device having an integrated USB cable and a power supply device having a connector capable of connecting with a power receiving device without using a USB cable are collectively referred to as a no-additional-cable-required type of power supply device.

Japanese Patent Laid-Open No. 2018-097643 does not envision a no-additional-cable-required type of power supply device. Therefore, even in a case where the authentication communication between a power receiving device and a no-additional-cable-required type of power supply device succeeds, the authentication communication is performed between the power receiving device and the USB cable. If the no-additional-cable-required type of power supply device does not support the authentication communication directed to the USB cable, the no-additional-cable-required type of power supply device fails the authentication communication directed to the USB cable, and the power supply from the no-additional-cable-required type of power supply device to the power receiving device may be unnecessarily restricted.

SUMMARY

According to various embodiments, there is provided an electronic device having a cable that includes: a storage unit that stores first authentication information used for an authentication communication directed to the electronic device and second authentication information used for an authentication communication directed to the cable; and a communication unit that is capable of responding to an authentication communication directed to the electronic device and is also capable of responding to an authentication communication directed to the cable.

According to the various embodiments, there is provided a method that includes: responding to an authentication communication directed to an electronic device, the electronic device having a cable and a storage unit that stores first authentication information used for an authentication communication directed to the electronic device and second authentication information used for an authentication communication directed to the cable; and responding to an authentication communication directed to the cable.

Further aspects of the disclosure will become apparent from the following description of example embodiments.

BRIEF DESCRIPTION OF THE DRAWINGS

FIG. 3 is a diagram for illustrating an example of an operation sequence in the power supply system.

FIG. 4 is a flowchart relating to an operation of a PD communication unit 121 of the power supply device 100.

DESCRIPTION OF THE EMBODIMENTS

Example embodiments, features, and aspects of the disclosure will be described below with reference to the drawings. However, embodiments of the invention are not limited to the following example embodiments.

Figure 1:
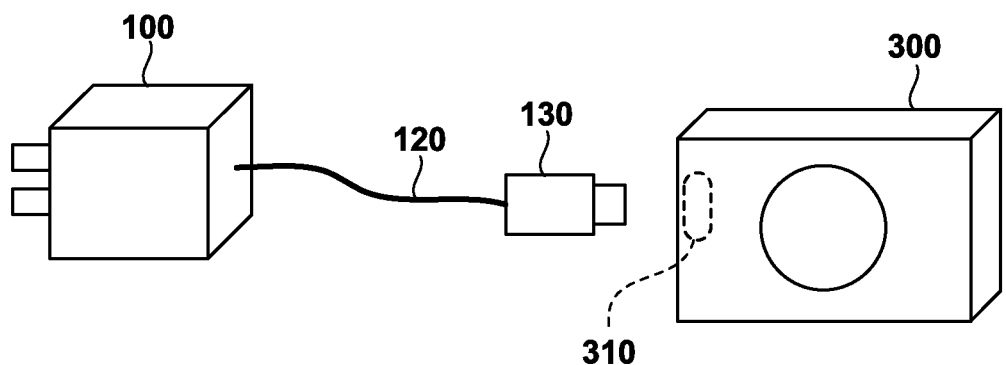
FIG. 1 is a diagram for illustrating an example of a configuration of a power supply system according to first and second embodiments.

[First Embodiment] FIG. 1 is a diagram for illustrating an example of a configuration of a power supply system according to first and second embodiments.

As illustrated in FIG. 1, a power supply system according to the first and second embodiments described herein includes a power supply device 100 and a power receiving device 300 capable of operating with power supplied from the power supply device 100. Both the power supply device 100 and the power receiving device 300 are electronic devices that conform to USB (Universal Serial Bus) PD (Power Delivery) standard and USB Type-C standard.

The power supply device 100 is a power supply device having an integrated USB cable (hereinafter, simply referred to as a cable) 120. The power supply device 100 is, for example, an electronic device capable of acting as a USB-AC adaptor, a mobile battery, a personal computer, or a tablet computer.

Note that the power supply device 100 is not limited to a power supply device to which the cable 120 is integrated. The power supply device 100 may be a power supply device having a connector or receptacle capable of connecting to the power receiving device 300 without using the cable 120.

The power receiving device 300 has a USB Type-C receptacle (hereinafter referred to as a receptacle) 310 corresponding to a USB Type-C plug (hereinafter referred to as a plug) 130 provided at an end of the cable 120. The power receiving device 300 is an electronic device capable of acting as, for example, a digital camera, a digital video camera, a personal computer, a tablet computer, a media player, a PDA, a cellular phone, a smartphone, a game machine, a robot, or a drone.

Next, components of the power supply system illustrated in FIG. 1 will be described with reference to FIG. 2.

A power source unit 101 is configured by a rectification and smoothing unit, a DC/DC converter, or the like and rectifies commercial AC power inputted from an external unit and supplies power required for the respective components of the power supply device 100. Note that, in a case where DC power is inputted from an external unit or in a case where the power supply device 100 incorporates a battery, the power source unit 101 has a configuration corresponding to each case.

A control unit 102 includes, for example, a hardware processor (such as a CPU) that controls the respective components of the power supply device 100 and a memory that stores a program capable of being executed by the hardware processor. The memory of the control unit 102 stores, for example, a program for realizing exemplary operation of the power supply device 100, which will be described later. In this specification, the operation described as performed by the power supply device 100 is realized by the control unit 102 controlling the components of the power supply device 100.

A power supply unit 105 is connected to a VBUS line and supplies power to the power receiving device 300 connected to the power supply device 100. Here, it is assumed that the PD communication unit 121 and an authentication unit 122 to be described later operate with power supplied from the power supply unit 105. However, the PD communication unit 121 and the authentication unit 122 may operate with power supplied from the power source unit 101.

A pull-up resistor 106 is connected to a CC1 line and pulls up the CC1 line to a predetermined voltage. Here, it is assumed that a predetermined power source connected to the pull-up resistor 106 is the power source unit 101, a voltage of the predetermined power source is 5.0V, and a resistance of the pull-up resistor 106 is 10 kΩ. The voltage of the predetermined power source connected to the pull-up resistor 106 and the resistance of the pull-up resistor 106 may each be another value as long as the values are specified by the USB PD standard or USB Type-C standard.

The PD communication unit 121 is connected to the CC1 line of the cable 120 and performs communication (PD communication) based on the USB PD standard with the power receiving device 300 connected to the power supply device 100. The PD communication unit 121 can perform PD communication, as a power supply device, and PD communication, as a cable.

The authentication unit 122 is connected to the PD communication unit 121 and has a memory that stores authentication information issued from the promotion organization (the USB-IF) of the USB standard. Here, the authentication information is information required for authentication communication including certificate data indicating that the power supply device 100 is recognized by the USB-IF as a predetermined device (a device conforming to the USB standard) or the like. The memory of the authentication unit 122 stores first authentication information related to the power supply device 100 and second authentication information related to the cable 120.

When authentication information is requested from the power receiving device 300 by PD communication, the authentication unit 122 transmits the authentication information to the power receiving device 300 via the PD communication unit 121.

Furthermore, the authentication unit 122 may determine whether the power receiving device 300 is a device authenticated by the USB-IF by decrypting using certificate data the encrypted authentication information of the power receiving device 300 acquired from the power receiving device 300 by PD communication.

In a case where a stand-alone cable is used, it is not determined which of the CC1 line and a CC2 line is used for PD communication and which is used for supplying Vconn until the cable is connected. Therefore, the power supply device is required to have a configurations capable of connecting the pull-up resistor 106 both the CC1 line as well as the CC2 line and a configuration capable of supplying Vconn to both the CC1 line and the CC2 line.

However, the power supply device 100 can fixedly connect the pull-up resistor 106 to CC1 line because it has the cable 120. As a result, neither the configuration for selectively connecting the pull-up resistor 106 to one of the CC1 line and the CC2 line nor the configuration for supplying Vconn to the CC1 line is required. In addition, there is no need for a pull-up resistor needed to detect connection of the CC2 line.

The power supply device 100 does not have a configuration corresponding to the PD communication unit that a stand-alone cable has, and the PD communication unit 121 also functions as the PD communication unit of a cable. Therefore, a configuration for supplying Vconn to the PD communication unit of a cable for in a case where a stand-alone cable is used is not necessary.

Furthermore, the cable 120 does not need a PD communication unit and an authentication unit nor do they need a configuration for receiving a supply of Vconn from the power supply device 100.

On the other hand, the cable 120 needs to notify the power receiving device 300 that communication with the cable 120 is possible. Therefore, it has a pull-down resistor 206 for connecting the CC2 line and a GND.

The configuration of the power receiving device 300 will be described. A power source unit 301 includes a power source such as a lithium-ion battery, a DC/DC converter or the like. The power source unit 301 supplies the necessary power to each component of the power receiving device 300 from the power supplied from the connected power receiving unit 305 or the power source.

A control unit 302 includes, for example, a hardware processor (such as a CPU) that controls the respective components of the power receiving device 300 and a memory that stores a program capable of being executed by the hardware processor. The memory of the control unit 302 stores, for example, a program for realizing exemplary operation of the power receiving device 300, which will be described later. In this specification, the operation described as performed by the power receiving device 300 is realized by the control unit 302 controlling the components of the power receiving device 300.

A PD communication unit 303 is connected to a CC1 terminal and a CC2 terminal of the receptacle 310 and performs PD communication with the connected device via the CC1 line or the CC2 line. Here, since the pull-up resistor 106 is connected to the CC1 line and the pull-down resistor 206 is connected to the CC2 line by the power supply device 100, the PD communication unit 303 performs PD communication using the CC1 line.

An authentication unit 304 is connected to the PD communication unit 303 and includes a memory that stores authentication information required for authentication communication including certificate data for the power receiving device 300 issued from the USB-IF. The authentication unit 304 can determine whether the power supply device 100 is a predetermined device (a device conforming to the USB PD standard and the USB Type-C standard) by decrypting using the certificate data the authentication information of the power supply device 100 acquired from the power supply device 100 by PD communication. Furthermore, the authentication unit 304 can determine whether the cable 120 is a predetermined cable (a cable conforming to the USB PD standard and the USB Type-C standard) by decrypting using the certificate data the authentication information of the cable 120 acquired from the power supply device 100 by PD communication.

When authentication information is requested from the power supply device 100 by PD communication, the authentication unit 304 can transmit the authentication information stored in the memory of the authentication unit 304 to the power supply device 100 via the PD communication unit 303.

A power receiving unit 305 is connected to a VBUS terminal of the receptacle 310 and receives power supplied from the power supply device 100 via the VBUS line. The power receiving unit 305 may supply the supplied power to the power source unit 301 and charge the power source that the power source unit 301 has. Here, the PD communication unit 303 and the authentication unit 304 are assumed to operate with power supplied through the VBUS line. However, they may operate with power from the power source unit 301.

A pull-down resistor 306 connects the CC1 terminal and the GND of the receptacle 310 and has a value specified in the USB PD standard or the USB Type-C standard (here, 5.1KΩ).

A pull-down resistor 307 connects the CC2 terminal of the receptacle 310 to the GND when selected by a switch 308. The pull-down resistor 307 has a value specified in the USB PD standard or the USB Type-C standard (here, 5.1KΩ).

The switch 308 selectively connects the CC2 terminal of the receptacle 310 to either the power source supplying a predetermined voltage or the pull-down resistor 307. Here, the power source is the power source unit 301, and the voltage of the power source is assumed to be 5.0V. The switch 308 is controlled by the PD communication unit 303. When performing PD communication with the cable 120, the PD communication unit 303 controls the switch 308 to connect the CC2 line to the power source in order to use the CC2 line as Vconn. Otherwise, the PD communication unit 303 controls the switch 308 to connect the CC2 line to the pull-down resistor 307.

Figure 2:
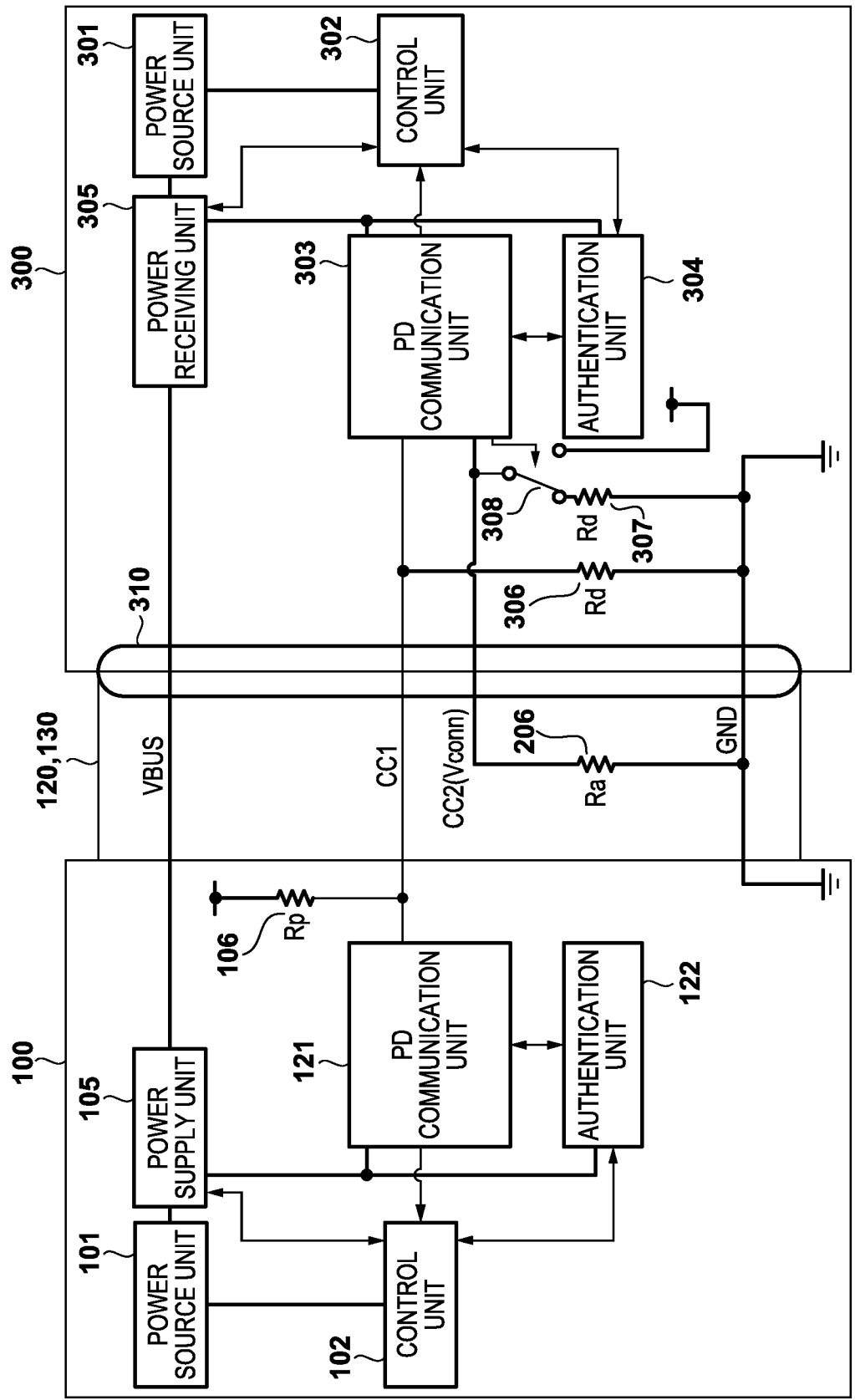
FIG. 2 is a diagram for illustrating components of a power supply device 100 to which a cable 120 is integrated and components of a power receiving device 300.

Although not illustrated in FIG. 2, the same switch as the switch 308 is also provided between the CC1 line and the pull-down resistor 306, and the operation of the switch is also controlled by the PD communication unit 303. The PD communication unit 303 connects the CC1 line to the pull-down resistor 306 in a case where the CC1 line is used for PD communication with the power supply device 100. In a case where PD communication is performed with the cable 120 using the CC1 line, the switch 308 is controlled to connect the CC1 line to the power source in order to use the CC1 line as Vconn. This power source is the power source unit 301 as is the power source connected to the CC2 line, and the voltage of the power source is 5.0V.

Next, an operation sequence of the power supply system will be described with reference to FIG. 3.

Step S301 is started when the power receiving device 300 is connected to the cable 120 of the power supply device 100. In step S301, the power supply device 100 detects that the power receiving device 300, which is an external device, has been connected to the power supply device 100. The pull-down resistor 306 is connected to the CC1 line when the plug 130 of the cable 120 is connected to the receptacle 310 of the power receiving device 300. Therefore, the voltage of the CC1 line changes to a voltage depending on the resistances of the pull-up resistor 106 and the pull-down resistor 306 (e.g., 1.1V). The PD communication unit 121, which monitors the voltage of the CC1 line, determines that the power receiving device 300 has been connected to the power supply device 100 upon detecting a change in voltage due to the pull-down resistor 306 being connected to the CC1 line. The PD communication unit 121 notifies the control unit 102 upon detecting the connection of the power receiving device 300.

In step S302, the control unit 102 causes the power supply unit 105 to start the power supply to the VBUS line (e.g. 5V, 100 mA) upon receiving from the PD communication unit 121 a notification to the effect that the connection of the power receiving device 300 has been detected.

Step S303 is started when the power receiving unit 305 of the power receiving device 300 detects the power supply to the VBUS line. In step S303, the power receiving unit 305 detects that the power receiving device 300, which is an external device, has been connected to the power supply device 100.

If the cable 120 is not integrated, the power supply device 100 needs to perform authentication communication with the cable 120 after starting the power supply to the VBUS line. According to the first embodiment, the control unit 102 recognizes that the cable 120 is integrated (i.e., authentication communication with the cable 120 is unnecessary). Therefore, the control unit 102 can start negotiation with the power receiving device 300 without performing authentication communication directed to the cable 120. In step S304, the PD communication unit 121 performs negotiation communication defined in the USB PD standard with the PD communication unit 303 via CC1 line. In the negotiation communication, information relating to the power supply capability of the power supply device 100 is transmitted to the power receiving device 300. A request for power based on the power supply capability is transmitted from the power receiving device 300 to the power supply device 100.

In step S305, negotiation communication is completed.

In step S306, the power receiving device 300 performs authentication communication with the power supply device 100 as an authentication initiator in the USB AUTH standard. In the authentication communication, the power receiving device 300 acquires authentication information from the power supply device 100 and determines whether or not the power supply device 100 is a predetermined device (a device conforming to the USB PD standard and the USB Type-C standard).

In step S307, it is assumed that the power supply device 100 is determined to be a predetermined device (i.e., the authentication communication with the power supply device has succeeded). In a case where the authentication communication with the power supply device 100 has succeeded, the process proceeds to step S308.

In step S308, the power receiving device 300 performs a particular communication (Vconn_Swap communication) with the power supply device 100 as a preparatory operation for authentication communication the cable 120 connecting the power receiving device 300 and the power supply device 100. The Vconn_Swap communication is communication for switching a device that supplies power to a circuit (e.g., a PD communication unit and an authentication unit) for authentication communication included in the cable 120. According to the USB PD standard, a device that supplies Vconn can communicate with a cable. According to the USB PD standard, it is specified that the power supply device (source) supplies Vconn in the initial state. Therefore, in a case where the power receiving device (sink) communicates with the cable, the state needs to be such that the power receiving device supplies Vconn prior to the communication. In order to switch the supply source of Vconn from the power supply device 100 (source), which is the default, to the power receiving device 300 (sink), the power receiving device 300 performs Vconn_Swap communication prior to communication with the cable.

As previously described in the first embodiment, since the cable 120 does not have the PD communication unit and the authentication unit, the power supply device 100 does not supply Vconn to the cable 120. However, the power receiving device 300 does not know that the cable 120 is integrated in the power supply device 100. Therefore, the power receiving device 300 performs Vconn_Swap communication before the authentication communication directed to the cable 120 is performed in accordance with the USB PD standard.

In step S308, the PD communication unit 303 transmits a Vconn_Swap message. The PD communication unit 121 transmits an Accept message notifying that the switching of Vconn supply source is permitted upon receiving the Vconn_ Swap message from the PD communication unit 303.

In step S309, when the PD communication unit 303 receives the Accept message, it controls the switch 308 to switch the CC2 line from a state in which it is connected to the GND by the pull-down resistor 307 to a state in which it is connected to a predetermined voltage power source. Thus, power (Vconn) will be supplied from the power receiving device 300 to the CC2 line.

According to the first embodiment, the cable 120 is integrated in the power supply device 100 and does not have a PD communication unit and an authentication unit. As illustrated in FIG. 2, the CC2 line in the cable 120 is connected to the GND via the pull-down resistor 206. Therefore, Vconn supplied from the power receiving device 300 is not used for authentication communication directed to the cable 120. By Vconn not being used for authentication communication, it is possible to reduce the power consumption of the power receiving device 300. Since the power receiving device 300 is often a battery-driven device such as a mobile device, the power consumption reduction of the power receiving device 300 allows extension of operable time.

In step S310, the power receiving device 300 performs authentication communication according to the USB AUTH standard in order to determine whether the cable 120 is a predetermined cable (a cable conforming to the USB standard). For example, the PD communication unit 303 performs authentication communication by communication (SOP* communication) targeting the cable 120 via the CC1 line.

In the USB PD standard, the destination of a message is specified by Start of Packet (SOP) in the message. Therefore, the PD communication unit 303 performs authentication communication using a message destined to the cable 120 (a plug connected to the power supply device 100). According to the first embodiment, the PD communication unit 121 acts as a PD communication unit of the cable 120 by responding to messages destined to the cable 120 in addition to messages destined to the power supply device 100. In the authentication communication, the PD communication unit 121 acquires authentication information related to the cable 120 from the authentication unit 122 in response to a request from the PD communication unit 303. Then, the PD communication unit 121 transmits authentication information related to the cable 120 to the PD communication unit 303.

In step S311, the PD communication unit 303 supplies the authentication information acquired in step S310 to the authentication unit 304. The authentication unit 304 determines whether or not the cable 120 is a predetermined cable (a cable conforming to the USB PD standard and the USB Type-C standard) by decrypting the authentication information using the certificate data. Here, it is assumed that the cable 120 has been determined to be a predetermined cable (i.e., the authentication communication has succeeded).

By the authentication communication directed to the power supply device 100 and the authentication communication directed to the cable 120 succeeding, the power receiving device 300 can request the power supply device 100 for a power larger than the power requested in the negotiation communication in step S304. In step S312, the PD communication unit 303 transmits a message requesting to change the supplied power to the PD communication unit 121 by PD communication through the CC1 line. The PD communication unit 303 requests the power required to realize all the functions of the power receiving device 300, for example, based on the information related to the power supply capability of the power supply device 100 acquired in step S304. The PD communication unit 121 notifies the control unit 102 of the requested power based on the request message received from the PD communication unit 303.

In step S313, the control unit 102 controls the power supply unit 105 to supply the requested power to the VBUS line.

In step S314, the power receiving device 300 starts the process of receiving power supplied to the power receiving device 300 from the power supply device 100 via the cable 120.

The configurations of the power supply device 100 and the power receiving device 300 and the power supply control operation according to the USB PD standard have been described above. According to the first embodiment, the PD communication unit 121 and the authentication unit 122 of the power supply device 100 having the integrated cable 120 can behave as the PD communication unit and the authentication unit of the cable 120. As a result, the PD communication unit 121 can respond to the authentication communication directed to the cable 120. Therefore, it is possible to solve problems caused by a failure of authentication communication directed to the cable 120. Furthermore, since it is unnecessary to provide a PD communication unit and an authentication unit in the cable 120, the configuration of the cable 120 can be simplified.

Next, the operation of the PD communication unit 121 of the power supply device 100 will be further described with reference to the flowchart illustrated in FIG. 4.

When negotiation communication is completed between the power supply device 100 and the power receiving device 300 in step S305 of FIG. 3, the power supply device 100 and the power receiving device 300 will enter a state in which they are capable of PD communication with each other. Thereafter, when the PD communication unit 121 receives communication from the PD communication unit 303, the PD communication unit 121 performs the operation illustrated in FIG. 4.

In step S401, the PD communication unit 121 determines whether or not the destination of the communication (a message) received from the PD communication unit 303 is the power supply device 100. As mentioned above, the destination of the message is specified in the SOP. Therefore, the PD communication unit 121 can determine the communication destination based on the SOP of the message. In a case where it is determined that the destination of the communication is the power supply device 100 in step S401 (YES in step S401), the PD communication unit 121 performs the process of step S407. In a case where it is determined that the destination of the communication received in step S401 is not the power supply device 100 (NO in step S401), the PD communication unit 121 performs the process of step S402.

In step S407, the PD communication unit 121 responds to the communication received in step S401. For example, in a case where the authentication communication is received in step S401, the PD communication unit 121 acquires authentication information related to the power supply device 100 from the authentication unit 122 and transmits the authentication information to the PD communication unit 303.

In step S402, the PD communication unit 121 determines whether or not the destination of the communication received in step S401 is the cable 120. In a case where it is determined that the destination of the communication received in step S401 is not the cable 120 (NO in step S402), the PD communication unit 121 performs the process of step S403. In a case where it is determined that the destination of the communication received in step S401 is the cable 120 (YES in step S402), the PD communication unit 121 performs the process of step S404.

In step S403, the PD communication unit 121 determines a communication error. In a case where a communication error is determined, the PD communication unit 121 does not respond to the received communication.

In step S404, the PD communication unit 121 determines whether or not a particular communication (Vconn_Swap communication) has been received from the power receiving device 300. In a case where it is determined that Vconn_Swap communication has been received from the power receiving device 300 (YES in step S404), the PD communication unit 121 performs the process of step S406. In a case where it is not determined that Vconn_Swap communication has been received from the power receiving device 300 (NO in step S404), the PD communication unit 121 performs the process of step S405.

In step S405, the PD communication unit 121 does not respond to the communication received in step S401. As described above, in a case where the power receiving device 300 communicates with the cable, the Vconn supply source needs to be switched to the power receiving device 300 prior to the communication. Therefore, in a case where communication destined to the cable is received prior to Vconn_Swap communication for switching the Vconn supply source to the power receiving device 300, the PD communication unit 121 does not respond to the communication destined to the cable.

In step S406, the PD communication unit 121 responds to the communication received in step S401. The PD communication unit 121 responds to communication as a PD communication unit of the cable 120, unlike in step S407. For example, in a case where the communication received in step S401 is authentication communication, the PD communication unit 121 acquires authentication information related to the cable 120 from the authentication unit 122 and transmits the authentication information to the PD communication unit 303.

As described above, according to the first embodiment, in the power supply device 100 having the integrated cable 120, the PD communication unit 121 is configured to be capable of responding to authentication communication directed to the power supply device 100 and also capable of responding to authentication communication directed to the cable 120. Furthermore, the authentication information of the power supply device 100 and the authentication information of the cable 120 are stored in the memory of the authentication unit 122. Therefore, the power supply device 100 can behave appropriately for authentication communication performed from the power receiving device 300 to the cable 120. Thus, regarding the power supply device 100 having the integrated cable 120, it is possible to avoid the occurrence of a problem in which authentication communication directed to the power supply device 100 has succeeded but authentication communication directed to the cable 120 has failed.

According to the first embodiment, since the configuration used for the authentication communication directed to the power supply device 100 the configuration used for the authentication communication directed to the cable 120 have been commonalized, it is possible to simplify the configuration of the power supply device 100.

[Second Embodiment] According to the first embodiment, in a case where communication destined to the cable is received before Vconn_Swap communication is received, the power supply device 100 simply does not respond to the communication and does not perform any other operation. However, a power receiving device which performs communication destined to the cable without Vconn_Swap communication is not a device conforming to the USB PD standard. Therefore, in step S405, the PD communication unit 121 may notify the control unit 102 that the power receiving device does not conform to the USB PD standard. Then, upon receiving the notification, the control unit 102 may control the power supply unit 105 so as to restrict the power supply to the power receiving device 300.

For example, the control unit 102 may supply less power than the power for which the supply was started after negotiation communication (step S304) or may stop supplying power. Thus, the power supply device 100 can perform power supply to the power receiving device 300 that is not conforming to the USB PD standard with more emphasis on safety.

According to the first embodiment, Vconn supplied from the power receiving device 300 is pulled down to the GND, and the PD communication unit 121 and the authentication unit 122 are operated by power from the power supply unit 105 also in the authentication communication directed to the cable 120. However, in a case where authentication communication with the cable 120 is performed, the PD communication unit 121 and the authentication unit 122 may be operated by Vconn supplied by the power receiving device 300.

In this case, a switch for switching a path for supplying power to the PD communication unit 121 and the authentication unit 122, between a path from the power supply unit 105 and a path from the CC2 line is provided in the power supply device 100. Then, the switch is controlled so as to operate the PD communication unit 121 and the authentication unit 122 with power from the CC2 line while the power receiving device 300 is supplying Vconn to the CC2 line. Note that, there are cases where Vconn that can be supplied by the power receiving device 300 is not enough to operate the PD communication unit 121 and the authentication unit 122. In this case, the PD communication unit 121 and the authentication unit 122 are operated with power from the power supply unit 105 also while the power receiving device 300 is supplying Vconn to the CC2 line.

[Third Embodiment] Various functions, processes, or methods described in the first and second embodiments may also be implemented by a personal computer, a microcomputer, a CPU (Central Processing Unit), or a microprocessor executing a program. Hereinafter, in the third embodiment, a personal computer, a microcomputer, a CPU (Central Processing Unit), or a microprocessor are referred to as a "computer X." In the third embodiment, a program for controlling the computer X and realizing the various functions, processes, or methods described in the first and second embodiments is referred to as a "program Y".

The various functions, processes, or methods described in the first and second embodiments are realized by the computer X executing the program Y. In this case, the program Y can be supplied to the computer X via a computer-readable storage medium. The computer-readable storage medium in the third embodiment includes at least one of a hard disk device, a magnetic storage device, an optical storage device, a magneto-optical storage device, a memory card, a volatile memory, a nonvolatile memory, or the like.

The computer-readable storage medium of the third embodiment is a non-transitory storage medium.

While various embodiments of the disclosure are described with reference to example embodiments, it is to be understood that the aspects of the disclosure are not limited to the example embodiments. The scope of the following claims is to be accorded the broadest interpretation so as to encompass all such modifications and equivalent structures.

This application claims the benefit of Japanese Patent Application No. 2020-195360, filed Nov. 25, 2020, which is hereby incorporated by reference herein in its entirety.

What is claimed is:

1. An electronic device having a cable and supplying power to an external device connected to the electronic device via the cable, comprising:
   at least one processor and/or at least one circuit which causes the electronic device to function as:
      a storage unit that stores first authentication information used for an authentication communication directed to the electronic device and second authentication information used for an authentication communication directed to the cable; and
      a communication unit that is capable of responding to an authentication communication directed to the electronic device from the external device and is also capable of responding to an authentication communication directed to the cable from the external device in a case where the external device is connected to the electronic device via the cable,
   wherein the communication unit responds to the authentication communication directed to the electronic device using the first authentication information in a case where a destination of the authentication communication from the external device is the electronic device, and the communication unit responds to the authentication communication directed to the cable using the second authentication information in a case where a destination of the authentication communication from the external device is the cable.

2. The electronic device according to claim 1, wherein the communication unit determines whether a predetermined communication has been received prior to the authentication communication directed to the cable before responding to the authentication communication directed to the cable, in a case where the destination of the authentication communication received from the external device is the cable.

3. The electronic device according to claim 2, wherein the at least one processor and/or the at least one circuit further causes the electronic device to function as:
   a power supply unit that supplies power to the external device via the cable; and
   a control unit that controls supply of power by the power supply unit,
   wherein the control unit restricts the supply of power by the power supply unit, in a case where it is not determined that the predetermined communication has been received from the external device prior to the authentication communication directed to the cable.

4. The electronic device according to claim 2, wherein the supply of power conforms to a Universal Serial Bus Power Delivery (USB PD) standard, and the predetermined communication corresponds to a Vconn Swap communication.

5. The electronic device according to claim 1, wherein the electronic device has a plug or a receptacle capable of connecting to an external device in place of the cable.

6. The electronic device according to claim 1, wherein the electronic device is a power supply apparatus which conforms to a Universal Serial Bus Power Delivery (USB PD) standard and the authentication communication is an authentication communication conforming to USB AUTH standard, and
   wherein the communication unit responds to the authentication communication directed to the electronic device so as to be determined by the external device that the electronic device conforms to the USB PD standard and the communication unit responds to the authentication communication directed to the cable so as to be determined by the external device that the cable conforms to the USB PD standard.

7. The electronic device according to claim 1, wherein the at least one processor and/or the at least one circuit further causes the electronic device to function as:
   a control unit that controls supply of power to the external device,
   wherein the communication unit receives a request of the power, which is transmitted from the external device in a case where the authentication communication directed to the electronic device and the authentication communication directed to the cable are succeeded, and the control unit performs control to supply power requested by the external device to the external device.

8. The electronic device according to claim 1, further comprising:
   a power source circuit that receives commercial AC power and rectifies the commercial AC power, and
   wherein the electronic device supplies power to the external device using power from the power source circuit.

9. The electronic device according to claim 1, wherein the electronic device acts as a USB-AC adaptor.

10. A method comprising:
    communicating with an external device in a case where the external device is connected to an electronic device having a cable and supplying power to the external device via the cable;
    responding to an authentication communication directed to the electronic device received from the external device;
    responding to an authentication communication directed to the cable and received from the external device,
    wherein first authentication information used for the authentication communication directed to the electronic device and second authentication information used for the authentication communication directed to the cable are stored in the electronic device; and
    wherein the responding to the authentication communication directed to the electronic device is performed using the first authentication information in a case where a destination of the authentication communication received from the external device is the electronic device, and the responding to the authentication communication directed to the cable is performed using the second authentication information in a case where a destination of the authentication communication received from an external device is the cable.

11. The method according to claim 10, wherein the electronic device is a power supply apparatus which conforms to a Universal Serial Bus Power Delivery (USB PD) standard and the authentication communication is an authentication communication conforming to USB AUTH standard, and
    wherein the responding to the authentication communication directed to the electronic device is performed so as to be determined by the external device that the electronic device conforms to the USB PD standard and the responding to the authentication communication directed to the cable is performed so as to be determined by the external device that the cable conforms to the USB PD standard.

12. The method according to claim 10, further comprising:
   receiving a request of the power from the external device in a case where the authentication communication directed to the electronic device and the authentication communication directed to the cable are succeeded; and
   supplying power requested by the external device to the external device.

13. The method according to claim 10, further comprising:
   receiving commercial AC power and rectifying the commercial AC power in a power source circuit of the electronic device, and
   supplying power to the external device using power from the power source circuit.

14. The method according to claim 10, wherein the electronic device acts as a USB-AC adaptor.

* * * * *